United States Patent
Okada et al.

(10) Patent No.: US 10,829,006 B2
(45) Date of Patent: Nov. 10, 2020

(54) VEHICLE SEAT DEVICE

(71) Applicant: AISIN SEIKI KABUSHIKI KAISHA, Kariya (JP)

(72) Inventors: Takashi Okada, Kariya (JP); Masaki Hayashi, Iwakura (JP)

(73) Assignee: AISIN SEIKI KABUSHIKI KAISHA, Kariya (JP)

( * ) Notice: Subject to any disclaimer, the term of this patent is extended or adjusted under 35 U.S.C. 154(b) by 96 days.

(21) Appl. No.: 16/093,771

(22) PCT Filed: Mar. 23, 2017

(86) PCT No.: PCT/JP2017/011882
§ 371 (c)(1),
(2) Date: Oct. 15, 2018

(87) PCT Pub. No.: WO2017/187857
PCT Pub. Date: Nov. 2, 2017

(65) Prior Publication Data
US 2019/0126781 A1 May 2, 2019

(30) Foreign Application Priority Data
Apr. 26, 2016 (JP) .................................. 2016-088177

(51) Int. Cl.
*B60N 2/02* (2006.01)
*B60N 2/06* (2006.01)

(52) U.S. Cl.
CPC ......... *B60N 2/0244* (2013.01); *B60N 2/0232* (2013.01); *B60N 2/06* (2013.01); *B60N 2002/0272* (2013.01)

(58) Field of Classification Search
CPC ...... B60N 2/0244; B60N 2/0232; B60N 2/06; B60N 2002/0272
(Continued)

(56) References Cited

U.S. PATENT DOCUMENTS 5,816,653 A * 10/1998 Benson ................ B60N 2/6671
297/284.4
2005/0248302 A1* 11/2005 Garland ................ B60N 2/305
318/280
(Continued)

FOREIGN PATENT DOCUMENTS

JP 2013-129251 A 7/2013

OTHER PUBLICATIONS

Fujimoto, JP 2007129825, May 24, 2007 (machine translation).*
(Continued)

*Primary Examiner* — Paula L Schneider
(74) *Attorney, Agent, or Firm* — Oblon, McClelland, Maier & Neustadt, L.L.P.

(57) ABSTRACT

This vehicle seat device is equipped with a position detection unit which detects the movement position of a vehicle seat. The position detection unit is equipped with a forward direction counting unit and a reverse direction counting unit. The forward direction counting unit counts, in a forward direction, pulse edges during the driving of a motor and pulse edges during the time interval in which the motor current changes from a first polarity to a second polarity opposite to the first polarity due to driving of the motor being stopped. The reverse direction counting unit counts, in a reverse direction opposite to the forward direction, the pulse edges during the time interval in which the motor current changes from the second polarity to the first polarity after driving of the motor is stopped.

3 Claims, 2 Drawing Sheets

(58) Field of Classification Search
USPC .......................................................... 701/49
See application file for complete search history.

(56) References Cited

U.S. PATENT DOCUMENTS

| | | | | |
|---|---|---|---|---|
| 2011/0316459 A1* | 12/2011 | Kawamura | ............... | H02P 6/16 |
| | | | | 318/400.21 |
| 2013/0154534 A1* | 6/2013 | Okada | .................. | B60N 2/0232 |
| | | | | 318/490 |
| 2014/0109478 A1* | 4/2014 | Mori | ........................ | B60J 5/00 |
| | | | | 49/26 |
| 2015/0061561 A1* | 3/2015 | Roppongi | ............... | H02P 3/025 |
| | | | | 318/470 |

OTHER PUBLICATIONS

English translation of the International Preliminary Report on Patentability and Written Opinion of the International Searching Authority dated Oct. 30, 2018 in PCT/EP2017/011882 filed Mar. 23, 2017, 5 pages.

International Search Report dated Jun. 13, 2017 in PCT/JP2017/011882 filed Mar. 23, 2017.

* cited by examiner

Fig.3A Pulse Signal
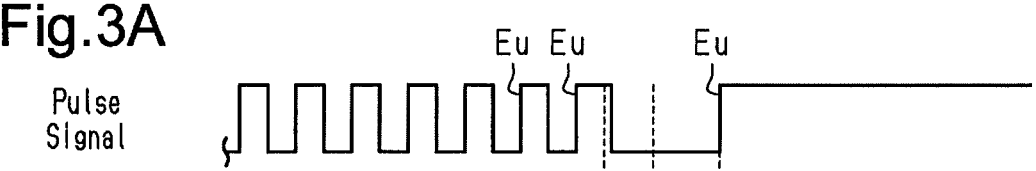
Fig.3B Motor Current
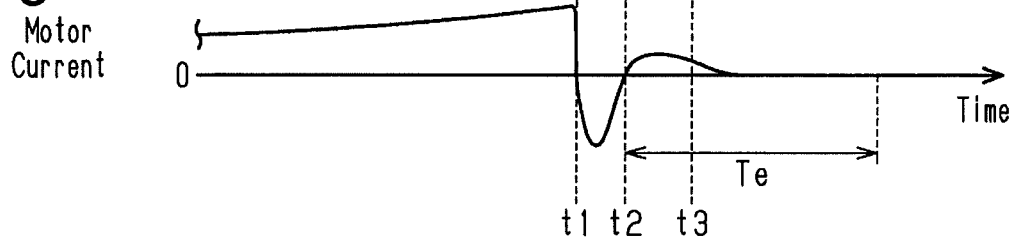
Fig.4
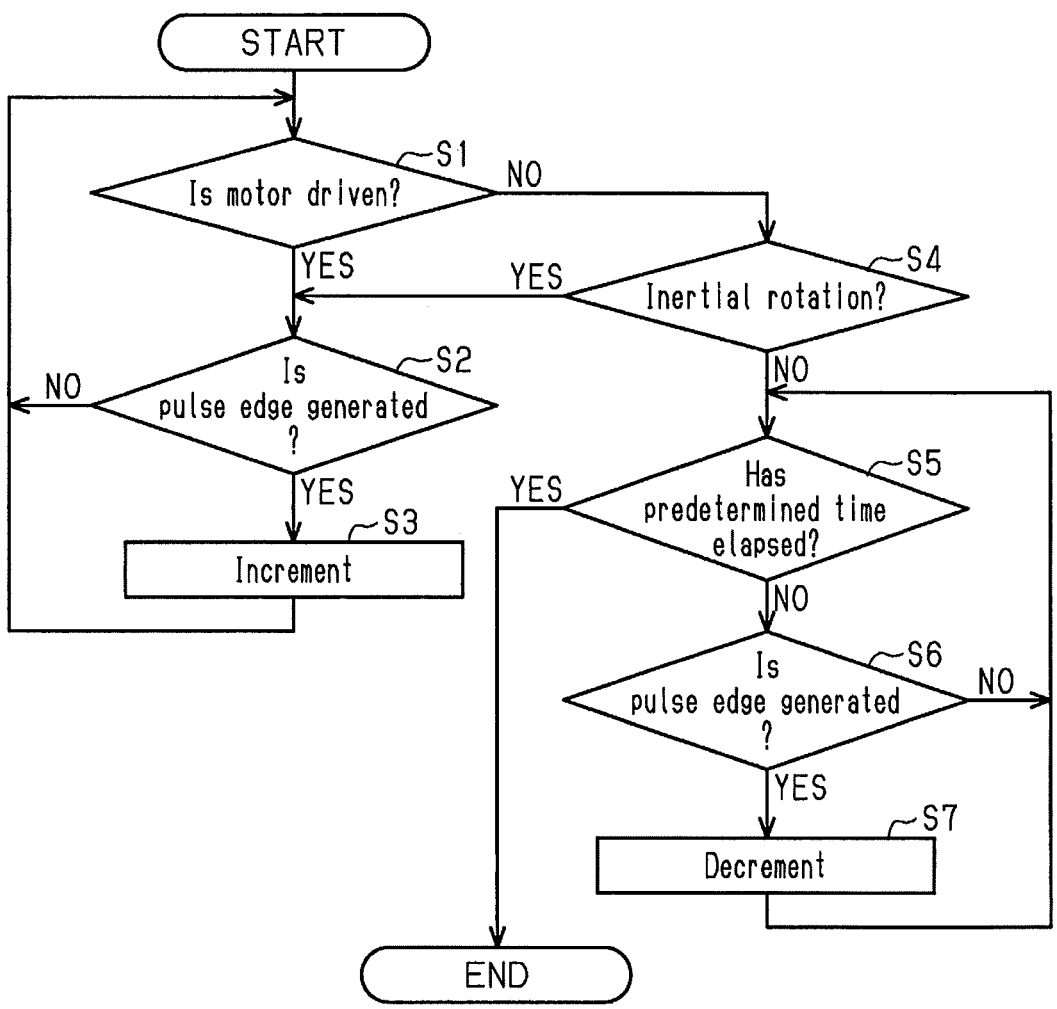

VEHICLE SEAT DEVICE

TECHNICAL FIELD

The present invention relates to a vehicle seat device.

BACKGROUND ART

In related art, there are vehicle seat devices that allow for adjustment of the position of a vehicle seat, such as a seat cushion or a seat back, with a motor. For example, Patent Document 1 discloses a seat slide device capable of adjusting a slide position of a seat cushion by driving a motor. Specifically, the seat slide device includes a lower rail fixed to the vehicle floor and an upper rail arranged to be movable relative to the lower rail. The seat slide device is configured to move the upper rail in the longitudinal direction of the lower rail with the driving force of the motor.

The seat slide device detects a movement position of the upper rail by counting the pulse edges of pulse signals output by a rotation sensor of the motor. The movement position detected by counting the pulse edges allows for the implementation of a function such as what is referred to as a seat memory that returns the seat to an adjustment position stored in advance, for example.

In order to correctly perform positional detection by counting pulse edges in such a manner, the rotation direction of the motor needs to be determined. However, when the motor driving stops, the rotation direction of the motor cannot be determined from a control instruction to the motor. In this respect, Patent Document 1 also suggests presuming reverse rotation occurring in motor rotation from the interval of two successive pulse edges detected after the motor driving stops. The presumption is made when the rotation speed of the motor after the motor driving has stopped is faster than when the motor driving is stopped thereby contradicting the condition for when the rotation direction does not change. Thus, if it is presumed that reverse rotation occurs in motor rotation after the motor driving has stopped, error in the positional detection will be reduced by accordingly correcting the count of pulse edges.

PRIOR ART DOCUMENT

Patent Document

Patent Document 1: Japanese Laid-Open Patent Publication No. 2013-129251

SUMMARY OF THE INVENTION

Problems that are to be Solved by the Invention

In Patent Document 1, the behavior of pulse edges is monitored after the motor driving has stopped. However, the determination of reverse rotation occurring in motor rotation is only a presumption made by comprehending the characteristics and tendencies of a vehicle seat in advance. Thus, there is a limit to reduction of errors in the positional detection.

It is an object of the present invention to provide a vehicle seat device that determines the rotation direction with improved accuracy after motor driving stops and reduces error in the positional detection based on the count of the pulse edges of pulse signals.

Means for Solving the Problem

A vehicle seat device includes: a driving member that moves a vehicle seat by driving of a motor; a controller that controls actuation of the driving member; a rotation sensor that outputs a pulse signal in which pulse edges appear in predetermined rotation cycles in synchronization with rotation of the motor; a motor current sensor that detects a motor current flowing through the motor; and a position detection unit that detects a movement position of the vehicle seat by counting the pulse edges in correspondence with a rotation direction of the motor. The position detection unit includes a forward direction counting unit that counts, in a forward direction, the pulse edges when the motor is being driven and the pulse edges in a period the motor current switches from a first polarity to a second polarity, which is opposite to the first polarity, as the driving of the motor stops, and a reverse direction counting unit that counts, in a reverse direction reversed from the forward direction, the pulse edges in a period the motor current switches from the second polarity to the first polarity after the driving of the motor is stopped.

BRIEF DESCRIPTION OF THE DRAWINGS

FIG. 3A is a time chart showing changes in a pulse signal.

FIG. 3B is a time chart showing changes in a motor current.

FIG. 4 is a flowchart showing control of the seat slide device in accordance with the embodiment.

EMBODIMENTS OF THE INVENTION

A seat slide device serving as a vehicle seat device according to one embodiment will now be described.

Figure 1:
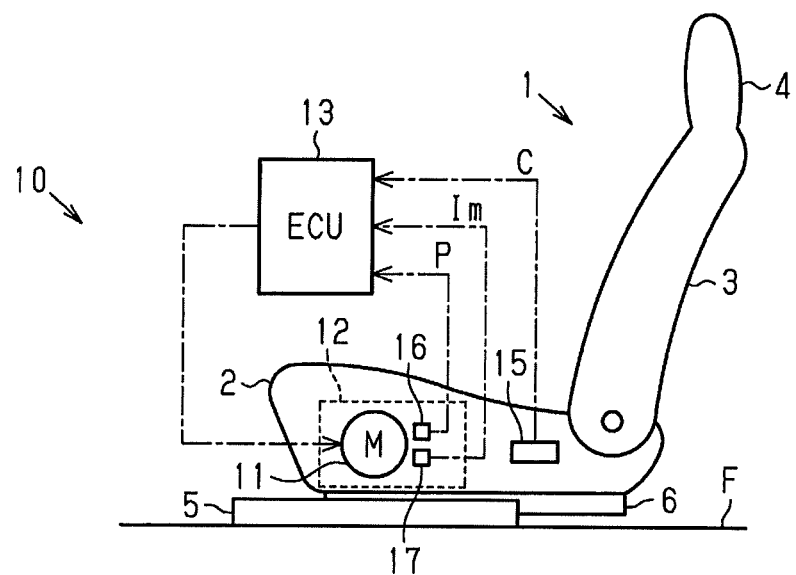
FIG. 1 is a schematic diagram illustrating the structure of a seat slide device serving as a vehicle seat device according to one embodiment.

As shown in FIG. 1, a vehicle seat 1 includes a seat cushion 2, a seat back 3 that is inclinable relative to the rear end of the seat cushion 2, and a headrest 4 arranged on the upper end of the seat back 3.

A pair of parallel lower rails 5 is arranged on a vehicle floor F. An upper rail 6 is mounted on each lower rail 5 so as to be movable relative to the lower rail 5. The seat cushion 2 is fixed onto the upper rails 6. The lower rails 5 and the upper rails 6 construct a seat slide device 10.

The seat slide device 10 includes an actuator 12 serving as a driving member, which is provided with a motor 11. The actuator 12 includes a nut-screw mechanism (not shown) arranged where appropriate between the lower rails 5 and the upper rails 6. The actuator 12 moves the upper rails 6 relative to the lower rails 5 by reducing the speed of the rotation produced by the motor 11 and transmitting the rotation to the nut-screw mechanism.

The seat slide device 10 also includes an electronic control unit (ECU) 13 serving as a controller that controls the operation of the actuator 12. An operation switch 15 arranged at one side of the seat cushion 2 is electrically connected to the ECU 13. An operation signal C output from the operation switch 15 in correspondence with an operation input performed by a seated person is input to the ECU 13. The ECU 13 controls the operation of the actuator 12 based on the operation signal C. As a result, the actuator 12 adjusts the position of the seat cushion 2 in the front and rear directions (right and left directions in the drawing) of the vehicle by driving the motor 11 to move the seat cushion 2 in the instructed direction.

Figure 2:
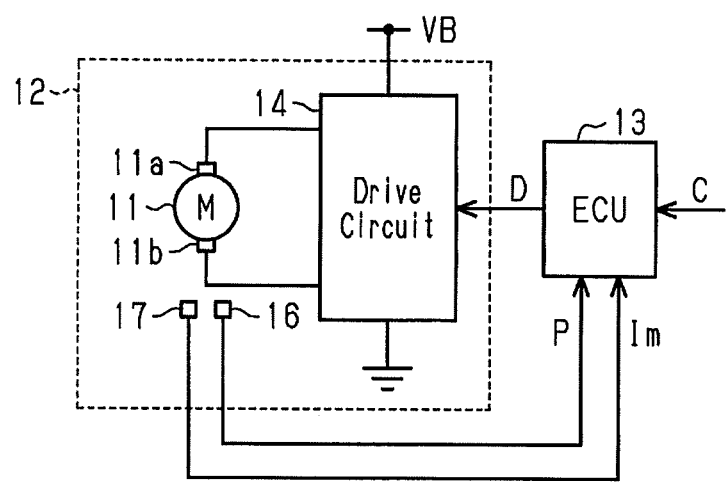
FIG. 2 is a schematic diagram illustrating the electric configuration of the seat slide device in accordance with the embodiment.

Specifically, as shown in FIG. 2, the actuator 12 includes a drive circuit 14 provided with a plurality of switch circuits (such as relay circuits and transistors). The actuator 12 is electrically connected to the ECU 13 via the drive circuit 14. The drive circuit 14 is electrically connected to two terminals 11a and 11b of the motor 11 and also electrically connected to a direct-current power supply VB (e.g., on-vehicle battery).

The ECU 13 generates a driving signal D based on the operation signal C and outputs the driving signal D to the drive circuit 14. The terminals 11a and 11b of the motor 11 are connected to the direct-current power supply VB via the drive circuit 14 in accordance with the polarity of the driving signal D. The motor 11 rotates forward or in reverse in accordance with the polarity of the direct-current power supply VB connected to the terminals 11a and 11b. The actuator 12 is configured to move the seat cushion 2 toward the front and the rear of the vehicle by driving the motor 11 to produce forward rotation or reverse rotation, for example.

The motor 11 is provided with a rotation sensor 16 that outputs a pulse signal P including pulse edges appearing in predetermined rotation cycles in synchronization with rotation of the motor 11. Specifically, the rotation sensor 16 is a magnetic type using a Hall element and outputs the pulse signals P in which the pulse edges appear in cycles of one-half of a rotation of the rotary shaft of the motor 11. A pulse edge is where the output level of the pulse signal P changes.

The rotation sensor 16 is electrically connected to the ECU 13. The ECU 13 (position detection unit) detects a movement position of the upper rail 6 by counting the pulse edges of the pulse signal P output by the rotation sensor 16. The movement position is detected by counting the pulse edges so that the seat slide device 10 according to the present embodiment includes a function referred to as a seat memory by which the seat returns to an adjustment position stored in advance, for example.

The motor 11 is provided with a motor current sensor 17 that detects and outputs a motor current Im flowing through the motor 11. The motor current sensor 17 may include a detection resistor connected in series with the motor 11, for example, or a combination of a magnetic core and a magnetometer (Hall element), which performs non-contact detection of a magnetic flux generated in proportion to the flowing current. If the motor current Im has a positive value or a negative value, the polarity of the motor current Im is positive or negative, respectively.

The motor current sensor 17 is electrically connected to the ECU 13. The ECU 13 detects the load of the motor 11, for example, based on the motor current Im output by the motor current sensor 17. Detection of an overload state where the load of the motor 11 exceeds a certain level enables the seat slide device 10 according to the present embodiment to include a function for detecting entrapment of an object between the lower rail 5 and the upper rail 6.

In addition, the ECU 13 detects the rotation direction of the motor 11 based on the motor current Im output by the motor current sensor 17. The ECU 13 counts the pulse edges of the pulse signals P in correspondence with the rotation direction of the motor 11.

The detection of the rotation direction of the motor 11 by the ECU 13 will now be described. In the description hereafter, it is assumed that the motor 11 is driven to produce forward rotation, and a count value CNT is incremented by only "1" whenever a pulse edge appears during the forward rotation. Further, when the motor 11 is driven to produce forward rotation, the detected polarity of the motor current Im will be positive. The ECU 13 outputting the driving signal D recognizes, that is, determines that the motor 11 is being driven to produce forward rotation.

As shown in FIGS. 3A and 3B, it is assumed that the motor 11 is continuously driven for forward rotation until time t1. In this case, the ECU 13 outputs the driving signal D for driving the motor 11 to produce forward rotation until time t1. At the same time, the ECU 13 (forward direction counting unit) increments the count value CNT by only "1" whenever the pulse edge, namely, the rising edge Eu, appears in the pulse signal P.

Then, at time t1, the ECU 13 stops the output of the driving signal D to stop driving of the motor 11 to produce forward rotation. The motor 11 (rotary shaft) continues to rotate because of inertia immediately after time t1, and the motor 11 thus functions as a power generator. The motor current Im during power generation switches from positive to negative, that is, from a first polarity to a second polarity that is opposite to the first polarity. In other words, in the period when the motor current Im switches from positive to negative immediately after time t1, the motor 11 is inertially rotated forward. Accordingly, the ECU 13 determines that the motor 11 is being inertially rotated, that is, rotated forward, based on the characteristics of the motor current Im. Further, in this state, the ECU 13 (forward direction counting unit) increments the count value CNT by only "1" whenever the pulse edge, namely, the rising edge Eu in a pulse signal P appears. In FIG. 3, the rising edge Eu does not appear in this period. Thus, the count value CNT is not updated.

Then, at time t2 at which the motor current Im becomes zero, it is considered that the power generation performed by the motor 11, namely, the inertial forward rotation, ends and the rotary shaft of the motor 11 is temporarily stopped. Then, in the period immediately after time t2 during which the motor current Im switches from negative to positive, that is, from the second polarity to the first polarity, the motor 11 still generates power with the polarity opposite to that during the inertial rotation of the motor 11. In other words, during this period, the motor 11 is rotated reversely with respect to the rotation direction of the motor 11 during inertial rotation. The reverse rotation results from the reactive force that the rotary shaft of the motor 11 receives from a load (member such as upper rail 6) after the driving of the motor 11 stops. Accordingly, the ECU 13 determines that that motor 11 is being rotated reversely based on the characteristics of the motor current Im. Then, in this state, the ECU 13 (reverse direction counting unit) decrements the count value CNT, that is, counts the count value CNT in the reverse direction by only "1" whenever a pulse edge, namely, the rising edge Eu in a pulse signal P appears. In FIG. 3, the rising edge Eu appears at time t3 during this period. Thus, the count value CNT is updated, that is, decremented.

The ECU 13 (count stop unit) stops counting the pulse edges after a predetermined time Te elapses from time t2. Time t2 is the time at which the motor current that is switched from the first polarity to the second polarity after the driving of the motor is stopped reaches zero. The predetermined time Te is set based on the time when the reverse rotation substantially ends, that is, the time when a rising edge Eu no longer appears.

The updating of the count value CNT by the ECU 13 when the motor 11 is rotated forward will now be described. This process is initiated when the motor 11 starts to rotate forward.

As shown in FIG. 4, when the process proceeds to the routine, the ECU 13 determines whether or not the motor 11 is being driven based on the driving signal D (step S1). If determined that the motor 11 is being driven, the ECU 13 determines whether or not a rising edge Eu has appeared (step S2). If determined that a rising edge Eu has appeared, the ECU 13 increments the count value CNT by only "1" (step S3) and returns to step S1. If determined that a rising edge Eu has not appeared, the ECU 13 directly returns to step S1. Accordingly, when entering this routine, for a while, the count value CNT is updated, that is, incremented by repeating the processes in steps S1 to S3 as the motor 11 continuously rotates forward.

In contrast, if determined that the motor 11 is not being driven in step S1, the ECU 13 determines whether or not the motor 11 is being inertially rotated based on the motor current Im (step S4). If determined that the motor 11 is being rotated by inertia, the motor 11 is still rotating forward. Thus, the ECU 13 proceeds to step S2 and performs the same process. Specifically, immediately after forward rotation driving of the motor 11 ends, the count value CNT is updated, that is, incremented as the inertial forward rotation of the motor 11 continues.

If determined that the motor 11 is not being rotated by inertia in step S4, the ECU 13 determines whether or not the predetermined time Te has elapsed from the time at which the motor current Im reached zero when the inertial rotation ended (step S5). If determined that the predetermined time Te has not elapsed, the motor 11 is most likely rotating in a direction that is reverse to the rotation direction during inertial rotation. Thus, the ECU 13 determines whether or not a rising edge Eu has appeared (step S6). If determined that a rising edge Eu has appeared, the ECU 13 decrements the count value CNT by only "1" (step S7) and returns to step S5. If determined that the rising edge Eu has not appeared, the ECU 13 directly returns to step S5. Accordingly, after the inertial rotation of the motor 11 ends, the count value CNT is updated, that is, incremented by repeating the processes in steps S5 to S7 as the reverse rotation of the motor 11 continues.

If determined that the predetermined time Te has elapsed in step S5, the ECU 13 ends the subsequent process.

A case where the motor 11 is rotated forward has been described. However, if the motor 11 is rotated in reverse, a similar description can be given by replacing the positive polarity and the negative polarity of the motor current Im with each other.

The present embodiment has the advantages described below.

(1) In the present embodiment, the ECU 13 determines the rotation direction of the motor 11 with improved accuracy after driving stops based on the actual motor current Im detected by the motor current sensor 17. During the driving of the motor 11 and the inertial rotation of the motor 11 subsequent to the driving, the ECU 13 counts the forward direction pulse edges. During reverse rotation of the motor 11 after the driving has stopped, the ECU 13 counts the reverse direction pulse edges. This reduces errors when positional detection is based on the counting of the pulse edges.

(2) In the present embodiment, the ECU 13 stops the counting of the pulse edges when the predetermined time Te has elapsed from the time (time t2) at which the motor current Im reaches zero when the driving of the motor 11 is stopped, that is, the end of the inertial rotation of the motor 11. This avoids unnecessary monitoring of reverse rotation of the motor 11 after the driving has stopped and thus reduces delays that may occur in operation control of the actuator 12 executed by the ECU 13.

(3) In the present embodiment, the rotation direction of the motor 11 is detected with the motor current sensor 17 that detects the load of the motor 11. This limits increases in the number of components.

The above embodiment may be modified as described below.

In the above embodiment, the counting of the pulse edges stops if the predetermined time Te elapses from when the inertial rotation of the motor 11 ends. However, the counting may stop at a time when the counting of the pulse edges in the opposite direction reaches "1" after inertial rotation of the motor 11 ends. This is because the angle of reverse rotation is usually very small after the driving of the motor 11 stops. Thus, the counting of the reverse direction is not likely to exceed "1." Unnecessary monitoring of reverse rotation after the driving of the motor 11 has stopped is also avoided in this case. This reduces delays that may occur in the operation control of the actuator 12 executed by the ECU 13, for example.

In the above embodiment, the pulse signal P output by the rotation sensor 16 may be formed such that when the motor 11 rotates at a constant speed, for example, a peak width, that is, the width from the rising edge to the falling edge, is the same as or different from a valley width, that is, the width from the falling edge to the rising edge.

In the above embodiment, the pulse signals P may be output by the rotation sensor 16 in any rotation cycles as long as pulse edges appear in predetermined rotation cycles in synchronization with the rotation of the motor 11 (rotary shaft).

In the above embodiment, the rotation sensor 16 may be of any type such as optical type, contact type, or the like as long as the rotation sensor 16 is capable of outputting pulse signals P in synchronization with the rotation of the motor 11.

In the above embodiment, the ECU 13 updates the count value CNT based on the appearance of the rising edge Eu in the pulse signal P. Instead of or in addition to, the count value CNT may be updated based on the appearance of the falling edge in the pulse signal P.

The present invention may be applied to any vehicle seat devices such as seat reclining devices, seat lifter devices, headrest lifter devices, ottoman devices, or the like as long as the device is configured to move the vehicle seat by driving a motor and detecting the movement position of the vehicle seat by counting motor pulses.

The invention claimed is:

1. A vehicle seat device comprising:
an actuator that moves a vehicle seat by driving of a motor;
a controller configured to control actuation of the actuator;
a rotation sensor that outputs a pulse signal in which pulse edges appear in predetermined rotation cycles in synchronization with rotation of the motor; and
a motor current sensor that detects a motor current flowing through the motor,
wherein the controller is further configured to detect a movement position of the vehicle seat by counting the pulse edges in correspondence with a rotation direction of the motor by
counting, in a forward direction, the pulse edges when the motor is being driven and the pulse edges in a period the motor current switches from a first polarity to a second polarity, which is opposite to the first polarity, as the driving of the motor stops, and counting, in a reverse direction reversed from the forward direction, the pulse edges in a period the motor current switches from the second polarity to the first polarity after the driving of the motor is stopped.

2. The vehicle seat device according to claim 1, wherein the controller is further configured to stop the counting of the pulse edges after a predetermined time elapses from when the motor current switched from the first polarity to the second polarity reaches zero after the driving of the motor is stopped.

3. The vehicle seat device according to claim 1, wherein the controller is further configured to stop the counting of the pulse edges at a time at which a reverse direction count of the pulse edges reaches "1."

* * * * *